June 24, 1969
R. H. BALL
3,451,265
FAST RESPONSE APPARATUS FOR MEASURING RATE
OF CHANGE OF PRESSURE
Filed Oct. 4, 1967
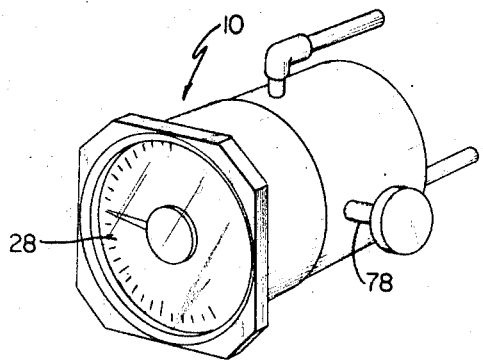
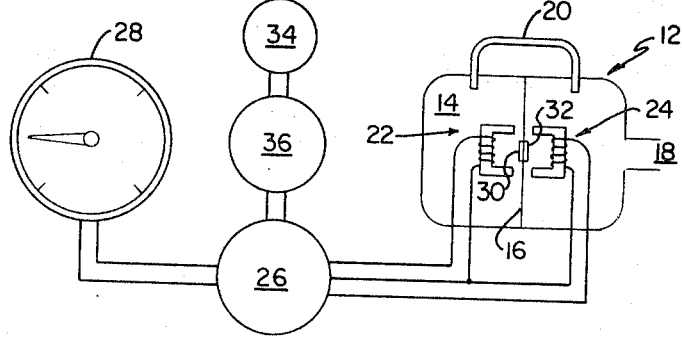
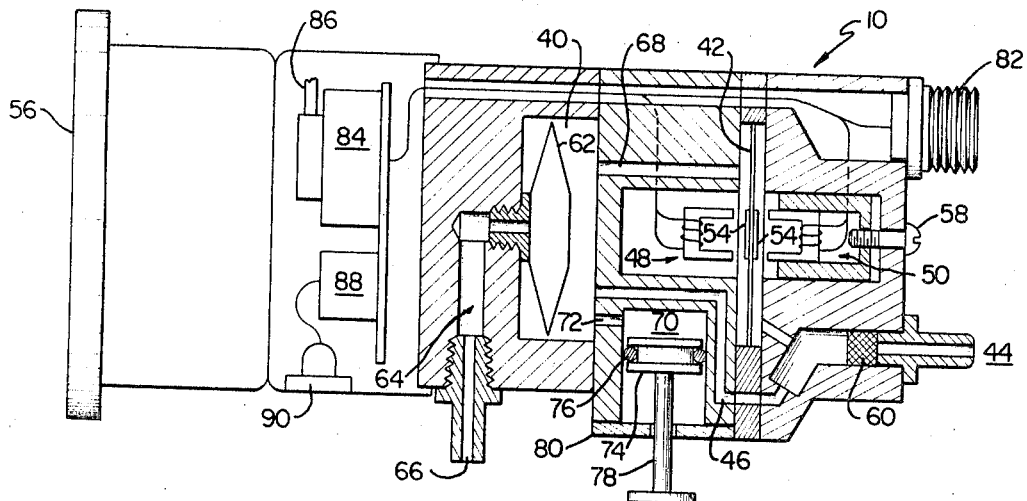
INVENTOR
RICHARD H. BALL
BY Sheridan and Ross
ATTORNEYS

United States Patent Office 3,451,265
Patented June 24, 1969

3,451,265
FAST RESPONSE APPARATUS FOR MEASURING RATE OF CHANGE OF PRESSURE
Richard H. Ball, Boulder, Colo.
(2040 Kohler Drive, Denver, Colo. 80202)
Filed Oct. 4, 1967, Ser. No. 672,841
Int. Cl. G01c 21/00
U.S. Cl. 73—179        16 Claims

ABSTRACT OF THE DISCLOSURE

A fast response apparatus for measuring the rate of change of a pressure, and for measuring the difference in the rate of change of two different pressures. The apparatus includes a pressure responsive diaphragm member, means for effecting flow between opposite sides of said pressure responsive diaphragm member directly proportional to the difference in pressures existing on opposite sides thereof, and variable inductive means for sensing movement of said diahragm member and generating an electrical signal in response thereto. The apparatus also includes a fast responsive means for sensing the rate of a change of a second pressure. The apparatus also includes means for varying the gain ratio of said apparatus through the use of a variable volume chamber. The means for effecting flow directly proportional to the difference between pressures existing on opposite sides of the pressure responsive diaphragm member may include a laminar flow restrictor means or a flow effecting means having a Reynolds number of approximately 2000 or less. The diaphragm member is formed from a flexible material in film form. A preferred material for use in making the diaphragm member is a material having a stretch modulus of elasticity of approximately 1,000,000 p.s.i. or less.

Background of the invention

Heretofore, there have been proposed many apparatuses for measuring the rate of change of a pressure. A common application for such an apparatus is for use as a rate of climb or variometer in a glider or other aircraft. One such type prior art instrument is the thermistor-type variometer. Although the thermistor-type variometer provides satisfactory performance under certain operating conditions, it is disadvantageous for a number of reasons. For example, for all practical purposes it is impossible to achieve linear operation close to zero because of the characteristics of the air nozzles used therein. Additionally, the thermistors require matching or compensating; they are extremely sensitive to ambient temperature change, and the sensitivity thereof varies with altitude and temperature. The so called mechanical type of variometers have moving parts which are adversely affected by friction. As a result, the reliability of mechanical-type variometers leaves much to be desired. Other apparatuses which have been proposed have proven to be disadvantageous in aircraft due to the force requirements involved in operating same. Additionally, other apparatuses of this type are not only expensive to manufacture but are also complex in their design operation. Further, most of the prior art apparatuses have involved long response times. Additionally, prior art apparatus did not permit the ascertainment of that portion of a rate of climb reading due only to "thermal" conditions.

Summary of the invention

It has been found that each of the foregoing disadvantages may be easily and quickly overcome through the use of an apparatus constructed in accordance with the subject invention. An apparatus constructed in accordance with the subject invention has a fast response time of approximately one second or less, is compact in construction and inexpensive to manufacture, is greatly simplified in its design and operation, is extremely reliable and involves very small power requirements to operate same and permits the measurement of the rate of climb of an aircraft due only to "thermal" conditions. An apparatus constructed in accordance with the subject invention comprises a chamber; a pressure responsive diaphragm member having one side thereof exposed to the pressure within said chamber and the other side thereof exposed to a pressure in a region outside of said chamber; fluid passage means interconnecting said chamber and said region, said fluid passage means including means for effecting flow between said chamber and said region substantially directly proportional to the difference in pressures therebetween; variable inductive means for sensing movement of said diaphragm member and generating an electrical signal in response thereto; and means responsive to said generated signal for indicating the rate of change of pressure within said region. The apparatus may also include a fast response means for sensing the rate of change of a second pressure, said fast response means comprising a pressure capsule, preferably formed of metal, disposed in said chamber, the ratio of volume change of said capsule to the volume of said chamber varying between approximately 1/10 to 5/10 with a ratio of approximately 1/4 being preferred, the inner part of said capsule being disposed in fluid communication with a second pressure.

Accordingly, one of the primary objects of this invention is to provide a fast response apparatus for measuring the rate of change of a pressure which is inexpensive to manufacture, compact and lightweight, highly reliable, and requires a minimum of power to operate same.

Another object of this invention is to provide an apparatus as aforedescribed which has a response period of approximately one second.

Another object of this invention is to provide an apparatus for measuring the difference in the rate of change of two different pressures.

Another object of this invention is to provide a fast response apparatus for measuring the rate of change of a pressure which includes a pressure responsive diaphragm member formed from a material in film form and having a stretch modulus of elasticity of approximately one million p.s.i. or less, means for effecting flow between opposite sides of said diaphragm member directly proportional to the difference in pressures therebetween, and a variable inductive means for sensing movement of said diaphragm member and generating an electrical signal in response thereto.

Another object of this invention is to provide a fast response apparatus as aforedescribed in which the diaphragm member is formed from a plastic material in film form and has a stretch modulus of elasticity between approximately 40,000 and 1,000,000 p.s.i.

Another object of this invention is to provide a fast response apparatus as aforedescribed in which said diaphragm member is formed from a polyester material in film form, said polyester material having a stretch modulus of elasticity between approximately 300,000 and 500,000 p.s.i., said polyester material being stretched to approximately one-half of the yield point thereof, and said variable inductive means including a strip of magnetically permeable material secured on one side of said diaphragm member.

Another object of this invention is to provide a fast response apparatus utilizing a flow effecting means comprising a laminar flow restrictor means.

Another object of this invention is to provide a fast response apparatus utilizing a flow effecting means having a Reynolds number of approximately 2000 or less.

Another object of this invention is to provide a fast response apparatus as aforedescribed which also includes a fast response means for sensing the rate of change of a second pressure, said fast response means comprising a pressure capsule disposed in said chamber, the ratio of the volume change of said capsule to the volume of said chamber varying between approximately 1/10 to 5/10, said capsule being disposed in fluid communication with a second pressure.

Another object of this invention is to provide a fast response apparatus as aforedescribed including means for varying the gain ratio of said apparatus, said gain varying means including a variable volume chamber.

Another object of this invention is to provide a fast response apparatus including a fast response means for sensing the rate of change of a second pressure, said fast response means comprising a pressure capsule formed from metal.

*Brief description of the drawings*

Various other advantages and features of novelty will become apparent as the description proceeds in conjunction with the accompanying drawings, in which:

FIGURE 1 is a perspective view of an apparatus constructed in accordance with the subject invention;

FIGURE 2 is a schematic view of one embodiment of an apparatus constructed in accordance with the subject invention; and FIGURE 3 is a schematic view of another embodiment of an apparatus constructed in accordance with the subject invention.

*Brief description of the preferred embodiment*

Referring now to the drawings, in FIGURE 1 is shown a perspective view of one embodiment of a fast response apparatus 10 for measuring the rate of change of a pressure. As shown in FIGURE 1, the apparatus 10 is compact in construction and packaged as an integral unit.

In FIGURE 2 is shown a schematic of another embodiment of an apparatus 12 constructed in accordance with the subject invention. The apparatus 12 comprises a chamber 14, a pressure responsive diaphragm member 16 formed from a material in film form and having a strength modulus of elasticity of approximately 1,000,000 p.s.i. or less, said diaphragm member having one side thereof exposed to the pressure within said chamber 14 and the other side thereof exposed to a pressure in a region 18 located outside of said chamber 14 through a fluid passage means interconnecting said chamber 14 and said region 18, said fluid passage means including means 20 for effecting flow between said chamber 14 and said region 18 substantially directly proportional to the difference in pressures therebetween, a pair of variable inductive means 22 and 24 for sensing movement of said diaphragm member 16 and generating an electrical signal in response thereto, each inductive means being disposed on a corresponding one of the sides of said diaphragm member 16, and means responsive to said generated signal for indicating the rate of change of pressure within said region, said latter means including a discriminator amplifier 26 and a meter 28. Each inductive means 22 and 24 includes a strip 30 and 32 of magnetically permeable material secured thereto on opposite sides of said diaphragm member 16. The apparatus 12 also includes a DC voltage regulator 34 and an oscillator 36. The apparatus 12 is connected to a DC power source (not shown) by lines 38. It will be understood when the apparatus 12 is used in an aircraft for the purpose of determining the rate of climb thereof, the side of the diaphragm member 16 exposed to the pressure within region 18 is exposed to the static pressure existing within said region 18.

In FIGURE 3 is shown a schematic view of the apparatus 10 shown in FIGURE 1. In FIGURE 3, apparatus 10 comprises a chamber 40, a pressure responsive diaphragm member 42 formed from a material in film form which has one side thereof exposed to the pressure within said chamber 40 and the other side thereof exposed to a pressure in a region 44 located outside of said chamber 40, fluid passage means interconnecting said chamber 40 and said region 44, said fluid passage means including means 46 for effecting flow between said chamber 40 and said region 44 substantially directly proportional to the difference in pressures therebetween, a pair of variable inductive means 48 and 50 for sensing movement of said diaphragm member 42 and generating an electrical signal in response thereto, each inductive means being disposed on a corresponding one of the sides of said diaphragm member 42, each inductive means also including a strip 54 of magnetically permeable material secured on the adjacent side of said diaphragm member 42, and means responsive to said generated signal for indicating the rate of change of pressure within said region of 44, said latter means including a discriminator amplifier (not shown) and a meter 56. One of the inductive means, such as inductive means 50 includes means, such as screw 58, for adjustably moving said means 50 toward and away from the other inductive means 48. The purpose for mounting inductive means 50 in this manner is to permit accurate and precise adjustment of inductive means 50, following assembly thereof, with respect to the diaphragm member 42 and inductive means 48 whereby inductive means 50 will be positioned the same distance away from diaphragm member 42 as that distance separating inductive means 48 from diaphragm member 42. As shown in FIGURE 3, the apparatus 10 may also include a filter 60 disposed intermediate the flow effective means 46 and the pressure in region 44.

The apparatus 10 shown in FIGURE 3 also includes a fast response means for sensing the rate of change of a second pressure. Said fast response means comprises a pressure capsule 62 disposed in chamber 40. The ratio of volume change of the pressure capsule 62 to the volume of chamber 40 varies between approximately 1/10 and 5/10. The interior of pressure capsule 62 is disposed in fluid communication by a passageway 64 with a second pressure such as the pressure existing adjacent a pitot pressure connection (not shown) in an aircraft. The fluid passageway 64 preferably includes a laminar flow restrictor means 66 for purposes of dampening or attenuating sharp pressure variations encountered adjacent the pitot pressure connection which may occur due to gusts of wind. The pressure capsule 62 is preferably formed from metal in order to provide a longer operating life for the apparatus. The pressure within chamber 40 is exposed to one side of the diaphragm member 42 through fluid passageway 68.

The apparatus 10 shown in FIGURE 3 also includes means for varying the gain ratio of the signal due to the rate of change of pressure within region 44 to the rate of change of pressure of the second pressure such as that existing against a pitot pressure connection (not shown). The gain ratio varying means includes a second chamber 70 which is disposed in fluid communication with chamber 40 by fluid passageway 72. Mounted within chamber 70 is a piston member 74 which has a suitable seal 76 disposed about the periphery thereof for sealingly engaging said piston member 74 with respect to the adjacent inner surface of chamber 70. Piston member 74 is connected to a rod 78 which is threadedly mounted within an end wall 80 circumscribing one end of chamber 70.

The apparatus 10 is connected to a DC source of electrical power (not shown) through connector 82. The apparatus 10 includes a DC voltage regulator (not shown) an oscillator (not shown) and a discriminator amplifier (not shown) all of which are mounted within circuit housing 84. The apparatus 10 also includes means 86 for adjusting the discriminator amplifier (not shown) and thereby controlling the gain of the electrical circuit. The apparatus 10 also includes an audio circuit mounted within housing 88 and an audio speaker 90.

With respect to the means 20 and 46 for effecting flow between pressures existing on opposite sides of the diaphragm members, it will be understood that said means must be capable of effecting fluid flow between the chamber and the region located outside of said chamber substantially directly proportional to the difference in pressures therebetween. The use of a laminar flow restrictor means accomplishes this result as well as the use of a fluid passage which has a Reynolds number of approximately 2000 or less. The foregoing is accomplished through the use of a relatively small diameter tube of predetermined length. However, the length and diameter of the tube are important factors affecting the overall operation of an apparatus constructed in accordance with the subject invention. For example, the apparatus desirably is constructed for high gain and a fast response. The gain of the apparatus is increased by increasing the length of the tube; however, the response of the apparatus is decreased by increasing the length of the tube. The gain of the apparatus is also increased by decreasing the diameter of the tube. However, the chance of the tube becoming clogged or obstructed with foreign particles which exist naturally within many environmental situations, particularly within the air surrounding an aircraft, increases as the diameter of the tube is decreased. Thus, a proper selection of tube diameter and length must be made for the application involved in order to obtain optimum performance.

An important part of an apparatus constructed in accordance with the subject invention is the use of a pair of inductive means in combination with a flexible, pressure responsive diaphragm member which has mounted upon a surface portion thereof a magnetically permeable strip of material, said diaphragm member being constructed for flexing or moving a finite distance extremely small pressure differentials existing thereacross. It has been found that a diaphragm member which is made from a flexible material in film form having a stretch modulus of approximately 1,000,000 p.s.i. or less meets the aforementioned requirements. Although a number of materials are suitable for use in manufacturing a diaphragm member to meet the above requirements including those having the above mentioned characteristics, it has been found that a polyester material sold under the designation Mylar by Du Pont and having a thickness of approximately 0.0025 inch and a stretch modulus of elasticity of approximately 400,000 to 500,000 p.s.i. capably meets the foregoing requirements. It is important that the material used to form the diaphragm member be mounted under a predetermined degree of tension in order to insure an increased operating life for the apparatus. It has been found that the aforesaid polyester material should be stressed to approximately one-half the yield point thereof before same is bonded or secured to the part of the apparatus upon which the polyester material is mounted. Thereafter, the aforesaid polyester material is heat treated by exposing same to a temperature between approximately 70 to 100° C. for approximately 30 seconds.

In order to minimize the effects of inertia and thereby increase the sensitivity of the herein apparatus, it is important to maintain to a minimum the mass of permeable magnetic material which is mounted upon the diaphragm member. It has been found that a strip of iron or a strip of stainless steel alloy which is mounted on a two inch diameter diaphragm member where the strip is approximately 0.001 inch thick and ⅛" and ½" adequately meets the foregoing requirements. The use of a minimum mass of magnetically permeable material is not only important from a sensitivity viewpoint but also important to minimize the effects of gravity encountered in a dive when an apparatus constructed in accordance with the subject invention is used in an aircraft. It will be appreciated that movement of the diaphragm member and its attached magnetically permeable material will change the inductance of one of the inductive means relative to the other inductive means. Further, the change in inductance as a result of this movement is substantial even though the movement is so slight that it cannot be detected with the eye.

The operation of the apparatus 12 shown in FIGURE 2 is now described. When the pressure within chamber 22 is equal to the pressure within region 18, the diaphragm member 16 is exactly centered between a pair of inductive means 22 and 24. Under these conditions, the inductance of these inductive means 22 and 24 is identical and the signals from each inductive means 22 and 24 cancel each other out and, thus, no signal is transmitted to the meter 28. However, upon a change in pressure within region 18, such as a decrease in said pressure, air will flow from the chamber 22 to the region 18 through the means 20 for effecting flow substantially directly proportional to the pressure differences between chamber 22 and region 18. Since a small time period is required for a sufficient quantity of pressurized air within chamber 22 to flow to the region 18, the flexible pressure responsive diaphragm member 16 will flex or move toward the right, as viewed in FIGURE 2. Movement of the diaphragm member 16 in this manner results in the magnetically permeable strips 30 and 32 being positioned closer with respect to the inductive means 24 than with respect to the inductive means 22 thereby changing the inductance of the inductive means 24 relative to the inductive means 22. Under these circumstances, the signal generated in inductive means 24 is no longer equal to the signal being generated in inductive means 22 and thus, said signals no longer cancel each other out. Therefore, a resulting signal is transmitted through the discriminator amplifier 22 to the meter 28. The meter 28 then gives an indication of the rate of change of pressure occurring within the region 18. When the apparatus 12 is used on an aircraft and region 18 is disposed in fluid communication with a static pressure connection (not shown) mounted upon said aircraft, the reading on meter 28 will be indicative of the rate of climb or descent of the aircraft. It would be understood that when the pressure within region 18 increases, the diaphragm member 16 will move to the left, as viewed in FIGURE 2, and a corresponding signal will again be indicated on the meter 26. However, in this instance when the apparatus 12 is mounted as aforesaid in an aircraft, this signal will be indicative of the rate of descent of the aircraft.

The operation of the apparatus 10 shown in FIGURE 3 is identical with respect to the operation described above with respect to apparatus 12 shown in FIGURE 2. However, apparatus 10 also includes a fast response means for sensing the rate of change of a second pressure. Where the apparatus 10 is used in an aircraft, the aforesaid means is disposed in fluid communication with a pitot pressure connection (not shown) mounted on the aircraft and used for air speed compensation. Where the apparatus 10 is used in a glider, it is quite important for the pilot to determine the rate of climb which is attributable solely to a "thermal." This means that the portion of the rate of climb which is attributable to intentionally or unintentionally diving or zooming of the aircraft must be taken into account and either compensated for or eliminated. The manner in which this is done will be readily understood in light of the following discussion. If it may be assumed that the glider is diving, it will be readily understood that the diaphragm member 42 will move to the left as a result of the increase in pressure within the region 44. However, at the same time capsule 62 will expand as a result of the increase in air speed pressure of the glider. Expansion of capsule 62 results in an increase in pressure within the chamber 40 which, in turn, will cause the diaphragm member 42 to move to the right. Thus, a portion of the rate of climb which is attributable to the speed of the aircraft has been compensated for or eliminated through the use of the capsule 62 disposed within the chamber 40 where the capsule 62 is disposed in fluid communication with a pitot pressure connection (not shown) mounted upon the glider. However, suitable air speed compensation in the foregoing manner requires that the ratio of the volume change of the capsule 62 to the volume of chamber 40 be maintained between approximately 1/10 to 5/10. As a matter of fact, it has been found that a ratio of approximately 1/4 is preferred. If the foregoing relationship is not observed, the portion of the rate of climb attributable to the speed of the aircraft will not be compensated for and the pilot will obtain a reading which will not be indicative of the amount of the "thermal."

Where the apparatus 10 includes a fast response means for sening the rate of change of a second pressure, it has been found that the gain ratio of the apparatus may be varied through the use of a variable volume chamber such as chamber 70. The gain for the rate of change of pressure within region 44 will be decreased by decreasing the volume of the chamber 70 and, correspondingly, the gain of the apparatus will be increased by increasing the volume of the chamber 70.

The signal generated by the change in the inductance of the inductive means 48 and 50 may also be used to actuate an audio speaker 90. For example, when the rate of climb exceeds a predetermined amount, the audio speaker 90 may be automatically actuated thereby providing an audio indication to the pilot of this condition.

In view of the foregoing, it will be readily appreciated that an apparatus for measuring the rate of change of a pressure which is compact in construction, inexpensive to manufacture and simple in operation has been described. In addition, since the diaphragm member is not directly connected to an indicating mechanism, it will be readily appreciated that the apparatus of this invention is free from the effects of friction and, thus, it is inherently more reliable than many of the prior art devices. Further, it will be also understood that through the use of transistors and the like, the apparatus of this invention will require a minimum of power to operate same. Additionally, not only does the apparatus of this invention operate with a fast response in providing to a pilot the rate of climb for the aircraft, but also the apparatus can provide to the pilot the rate of climb which is attributable solely to a "thermal" condition. This latter condition is, of course, quite important to glider pilots.

It is to be understood that this invention is not limited to the exact embodiments of the apparatuses shown, which are merely by way of illustration and not limitation, as various other forms and modifications will be apparent to those skilled in the art.

1. A fast response apparatus for measuring the difference in the rate of change of a pressure within a region and the rate of change of pressure of a second pressure, said apparatus comprising: a chamber; a pressure responsive diaphragm member having one side thereof exposed to the pressure within said chamber and the other side thereof exposed to a pressure in a region outside of said chamber; fluid passage means interconnecting said chamber and said region, said fluid passage means including means for effecting flow between said chamber and said region substantially directly proportional to the difference in pressures therebetween; a fast response means for sensing the rate of change of a second pressure, said fast response means including a pressure capsule disposed in said chamber, the ratio of volume change of said capsule to the volume of said chamber varying between approximately 1/10 to 5/10, said capsule being disposed in fluid communication with a second pressure; variable inductive means for sensing movement of said diaphragm member and generating an electrical signal in response thereto; and means responsive to said generated signal for indicating the difference in the rate of change of pressure within said region and the rate of change of said second pressure.

2. A fast response apparatus as described in claim 1 including means for varying the gain ratio of said apparatus, said gain ratio varying means including a second chamber disposed in fluid communication with said chamber, and means for varying the volume of said second chamber.

3. A fast response apparatus as described in claim 1 in which said capsule is formed from metal.

4. A fast response apparatus as described in claim 1 in which said variable inductive means includes a pair of variable inductors, each inductor being disposed on a corresponding one of the sides of said diaphragm member, at least one of said inductors being mounted for movement toward and away from the other said inductor.

5. A fast response apparatus for measuring the rate of change of a pressure, said apparatus comprising: a chamber; a pressure responsive diaphragm member having one side thereof exposed to the pressure within said chamber and the other side thereof exposed to a pressure in a region outside of said chamber; fluid passage means interconnecting said chamber and said region, said fluid passage means including means for effecting flow between said chamber and said region substantially directly proportional to the difference in pressures therebetween, said flow effecting means comprising a laminar flow restrictor means; a pair of variable inductive means for sensing movement of said diaphragm member and generating an electrical signal in response thereto, each inductive means bein disposed on a corresponding one of the sides of said diaphragm member, said variable inductive means including a strip of magnetically permeable material secured on opposite sides of said diaphragm member; and means responsive to said generated signal for indicating the rate of change of pressure within said region.

6. A fast response apparatus as described in claim 5 in which said diaphragm member is formed from a polyester material in film form, said polyester material having a stretch modulus of elasticity between approximately 300,-000 and 500,000 p.s.i., said polyester material being stressed to approximately one-half the yield point thereof.

7. A fast response apparatus as described in claim 5 in which at least one of said inductive means is adjustably mounted for movement toward and away from the other inductive means.

8. A fast response apparatus for measuring the rate or change of a pressure, staid apparatus comprising: a chamber; a pressure responsive diaphragm member, said diaphragm member having one side thereof exposed to the pressure within said chamber and the other side thereof exposed to a pressure in a region outside of said chamber; fluid passage means interconnecting said chamber and said region, said fluid passage means including means for effecting flow between said chamber and said region substantially directly proportional to the difference in pressures therebetween; a pair of variable inductive means for sensing movement of said diaphragm member and generating an electrical signal in response thereto, each inductive means being disposed on a corresponding one of the sides of said diaphragm member, and means responsive to said generated signal for indicating the rate of change of pressure within said region.

9. A fast response apparatus as described in claim 8 in which said diaphragm member is formed from a material in film form and having a stretch modulus of elasticity of approximately 1,000,000 p.s.i. or less.

10. A fast response apparatus as described in claim 8 in which said diaphragm member is formed from a plastic material in film form and having a stretch modulus of elasticity between approximately 40,000 p.s.i. and 1,000,000 p.s.i.

11. A fast response apparatus as described in claim 10 in which said diaphragm member is formed from a polyester material in film form, said polyester material having a stretch modulus of elasticity between approximately 300,000 and 500,00 p.s.i., said polyester material being stressed to approximately one-half the yield point thereof, and said variable inductive means including a strip of magnetically permeable material secured on one side of said diaphragm member.

12. A fast response apparatus as described in claim 8 in which said flow effecting means comprises a laminar flow restrictor means.

13. A fast response apparatus as described in claim 8 in which said flow effecting means has a Reynolds number of approximately 2,000 or less.

14. A fast response apparatus as described in claim 11 including a fast response means for sensing the rate of change of a second pressure, said fast response means comprising a pressure capsule disposed in said chamber, the ratio of volume change of said capsule to the volume of said chamber varying between approximately 1/10 to 5/10, said capsule being disposed in fluid communication with a second pressure.

15. A fast response apparatus as described in claim 14 including means for varying the gain ratio of said apparatus, said gain ratio varying means including a second chamber disposed in fluid communication with said chamber, and means for varying the volume of said second chamber.

16. A fast response apparatus as described in claim 14 in which said diaphragm member is formed from a polyester material in film form, said polyester material having a stretch modulus of elasticity between approximately 300,000 and 500,000 p.s.i., said polyester material being stressed to approximately one-half the yield point thereof; said variable inductive means includes a strip of magnetically permeable material secured on one side of said diaphragm member; and said flow effecting means comprises a laminar flow restrictor means.

References Cited

UNITED STATES PATENTS

| 2,275,719 | 3/1942 | Bevins | 73—179 |
| 2,775,122 | 12/1956 | Smith et al. | 73—179 |

LOUIS R. PRINCE, *Primary Examiner.*

DONALD O. WOODIEL, *Assistant Examiner.*

U.S. Cl. X.R.

73—398, 406